(12) United States Patent
Dias et al.

(10) Patent No.: US 10,184,044 B2
(45) Date of Patent: Jan. 22, 2019

(54) MULTILAYERED ARTICLE COMPRISING POLYPROPYLENE IMPACT COPOLYMERS, AND METHOD OF MAKING SAME

(71) Applicant: Braskem America, Inc., Philadelphia, PA (US)

(72) Inventors: Peter Simon Dias, Pittsburgh, PA (US); Debra R. Wilson, Missouri City, TX (US)

(73) Assignee: Braskem America, Inc., Philadelphia, PA (US)

( * ) Notice: Subject to any disclaimer, the term of this patent is extended or adjusted under 35 U.S.C. 154(b) by 519 days.

(21) Appl. No.: 14/774,021

(22) PCT Filed: Mar. 14, 2014

(86) PCT No.: PCT/US2014/027590
§ 371 (c)(1),
(2) Date: Sep. 9, 2015

(87) PCT Pub. No.: WO2014/152662
PCT Pub. Date: Sep. 25, 2014

(65) Prior Publication Data
US 2016/0016389 A1 Jan. 21, 2016

Related U.S. Application Data

(60) Provisional application No. 61/783,894, filed on Mar. 14, 2013.

(51) Int. Cl.
*C08L 23/14* (2006.01)
*B32B 27/08* (2006.01)
(Continued)

(52) U.S. Cl.
CPC ............ *C08L 23/14* (2013.01); *B29C 47/065* (2013.01); *B32B 1/02* (2013.01); *B32B 27/08* (2013.01);
(Continued)

(58) Field of Classification Search
CPC ........ C08L 23/14; C08L 23/12; C08L 23/142; C08L 2207/02; C08L 2205/025;
(Continued)

(56) References Cited

U.S. PATENT DOCUMENTS 5,856,406 A 1/1999 Silvis et al.
7,476,710 B2 1/2009 Mehta et al.
(Continued)

OTHER PUBLICATIONS

Extended European Search Report, Application No. 14775618 dated Jun. 23, 2016.

*Primary Examiner* — James C Yager
(74) *Attorney, Agent, or Firm* — Duane Morris LLP (57) ABSTRACT

A polymer sheet includes a core layer containing a propylene impact copolymer (ICP), and a first additional layer comprising a first polymer composition. The propylene impact copolymer (ICP) in the core layer includes a matrix and a dispersed phase. The matrix comprises a polypropylene homopolymer or a propylene/alpha-olefin random copolymer which includes greater than 50 wt. % of units derived from propylene monomer. The dispersed phase includes a copolymer of ethylene and a $C_3$-$C_8$ α-olefin. The ICP has a first melting point being greater than 100° C. (e.g., in the range of from 100° C. to 130° C.) and a second melting point. The polymer sheet can also include a second additional layer containing a second polymer composition.

19 Claims, 1 Drawing Sheet

(51) Int. Cl.
- *B32B 27/30* (2006.01)
- *B29C 47/06* (2006.01)
- *B32B 1/02* (2006.01)
- *B32B 27/32* (2006.01)
- *C08J 5/00* (2006.01)
- *C08J 5/18* (2006.01)
- *C08F 210/06* (2006.01)
- *C08L 23/12* (2006.01)
- *B29K 105/00* (2006.01)
- *B29C 49/02* (2006.01)
- *B29C 49/22* (2006.01)
- *B29K 23/00* (2006.01)

(52) U.S. Cl.
CPC .............. *B32B 27/30* (2013.01); *B32B 27/32* (2013.01); *C08F 210/06* (2013.01); *C08J 5/00* (2013.01); *C08J 5/18* (2013.01); *C08L 23/12* (2013.01); *C08L 23/142* (2013.01); *B29C 49/02* (2013.01); *B29C 49/22* (2013.01); *B29C 2049/028* (2013.01); *B29K 2023/12* (2013.01); *B29K 2105/258* (2013.01); *B29K 2995/0026* (2013.01); *B32B 2250/03* (2013.01); *B32B 2250/242* (2013.01); *B32B 2270/00* (2013.01); *B32B 2307/412* (2013.01); *B32B 2307/558* (2013.01); *B32B 2439/02* (2013.01); *C08J 2323/12* (2013.01); *C08J 2323/14* (2013.01); *C08J 2423/08* (2013.01); *C08L 2203/10* (2013.01); *C08L 2205/025* (2013.01); *C08L 2207/02* (2013.01)

(58) Field of Classification Search
CPC .. C08L 2203/10; C08F 210/06; B29C 47/065; B29C 2049/028; B29C 49/22; B29C 49/02; B32B 27/32; B32B 1/02; B32B 27/08; B32B 27/30; B32B 2439/02; B32B 2250/03; B32B 2307/412; B32B 2250/242; B32B 2270/00; B32B 2307/585; C08J 5/18; C08J 5/00; C08J 2423/08; C08J 2323/14; C08J 2323/12; B29K 2995/0026; B29K 2023/12; B29K 2105/258

See application file for complete search history.

(56) References Cited

U.S. PATENT DOCUMENTS

| | | |
|---|---|---|
| 2006/0281868 A1 | 12/2006 | Sudhin et al. |
| 2008/0045675 A1* | 2/2008 | Larson ............... B01J 8/003 526/65 |
| 2008/0255303 A1 | 10/2008 | Chou |
| 2009/0062429 A9 | 3/2009 | Coffey et al. |
| 2009/0105417 A1 | 4/2009 | Walton et al. |
| 2010/0249329 A1 | 9/2010 | Grein et al. |

* cited by examiner

MULTILAYERED ARTICLE COMPRISING POLYPROPYLENE IMPACT COPOLYMERS, AND METHOD OF MAKING SAME

RELATED APPLICATIONS

This application claims the benefit of U.S. Provisional Patent Application No. 61/783,894, filed Mar. 14, 2013, which is incorporated by reference in its entirety. International Application No. PCT/US2014/026292, filed Mar. 13, 2014, which also claims the benefit of U.S. Provisional Patent Application No. 61/783,894, filed Mar. 14, 2013, is incorporated by reference in its entirety.

FIELD OF THE INVENTION

The disclosure relates to polymers generally. More particularly, the disclosed subject matter relates to a polymer sheet or a fabricated article having a multiple-layered structure and comprising a polypropylene impact copolymer (ICP), and the method of making the polymer sheet or the fabricated article.

BACKGROUND OF THE INVENTION

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To address these issues, manufacturers have incorporated rubber, which forms a dispersed phase within the polypropylene matrix. These two-phase materials are referred to as impact copolymers or ICPs.

While impact resistance is improved, a major drawback to such materials is the poor transparency, mostly due to the rubber particles being large enough to affect light transmission in the heterophasic system. Accordingly, several attempts have been made to improve the transparency of heterophasic polymer systems.

Some ICPs have been able to achieve clarity by refractive index matching the dispersed phase to the matrix material. Other ICPs have sought to achieve clarity by increasing dispersed phase miscibility to achieve particles which are not large enough to affect the light transmission. While these approaches may produce clear materials, they generally lack the stiffness and/or toughness of a conventional ICP. It would be desirable to have an ICP which is clear, stiff and tough, and which is not based on either technique.

SUMMARY OF THE INVENTION

The present invention provides a polymer sheet having a multiple-layered structure, a fabricated article having a multiple-layered structure, and methods of making the same.

In some embodiments, the polymer sheet comprises a core layer comprising a propylene impact copolymer (ICP), and a first additional layer comprising a first polymer composition.

The propylene ICP in the core layer comprises a matrix and a dispersed phase. The matrix comprises a polypropylene homopolymer or a propylene/alpha-olefin random copolymer which comprises greater than 50 wt. % of units derived from propylene monomer. Examples of a suitable alpha-olefin as comonomer include but are not limited to butene, pentene, hexene, or octene. In some embodiments, the matrix is a propylene/alpha olefin random copolymer optionally comprising from 0.01 wt. % to 5 wt. %, for example, less than about 2.0 wt. %, of ethylene. The dispersed phase comprises a copolymer of ethylene and a $C_3$-$C_8$ α-olefin. The dispersed copolymer can be an ethylene-propylene copolymer in some embodiments. In some embodiments, the dispersed phase can be in the range from 5 wt. % to 20 wt. % of the total weight of the ICP. The ICP has a first melting point being greater than 100° C. (e.g., in the range of from 100° C. to 130° C.) and a second melting point. In some embodiments, both the first melting point and the second melting point are greater than 100° C.

In some embodiments, the first polymer composition in the first additional layer comprises at least one of a polypropylene homopolymer, a random copolymer of propylene comprising from 0.01 molar percent (mol. %) to 0.5 mol. % of ethylene, the propylene ICP and blends thereof.

In some embodiments, the polymer sheet further includes a second additional layer comprising a second polymer composition. The first additional layer and the second additional layer are in direct contact with the core layer in a sandwiched structure. In some embodiments, the second polymer composition in the second additional layer comprises at least one of a polypropylene homopolymer, a random copolymer of propylene comprising from 0.01 mol. % to 5 mol. % of ethylene, the propylene ICP and blends thereof. In some embodiments, the first additional layer and the second additional layer comprise the same composition.

The thickness of the core layer is in the range of from 60% to 99% of the total thickness of the polymer sheet. The thickness of the first and the second additional layers is in the range of from 2.5% to 40% of the total thickness of the polymer sheet.

In some embodiments, the first additional layer or the second additional layer comprises a blend comprising 15-50 wt. % of the propylene ICP and 50-85 wt. % of polypropylene homopolymer or a random copolymer of propylene comprising from 0.01 mol. % to 5 mol. % of ethylene. For example, in some embodiments, the first additional layer or the second additional layer comprises a blend comprising about 20% of the propylene ICP and about 80% of polypropylene homopolymer or a random copolymer of propylene comprising ethylene in the range from 0.2 mol. % to 1 mol. %.

The structure of the polymer sheet is not limited to a two-layer or three-layer sandwiched structure. The polymer sheet can have more than three layers comprising any number of the core layer, the first additional layer and the second additional layer in any combination.

In some embodiments, the polymer sheet can have a clarity of 80% or greater.

In some embodiments, the polymer sheet can have haze of 20% or less.

The present disclosure also provides a method of making the polymer sheet as described. The method comprises a step of co-extruding the core layer and the first additional layer. In some embodiments, the core layer, the first additional layer and a second additional layer are co-extruded together in a single step of multi-layer coextrusion. The first and the second additional layers are in direct contact with the core layer. In some embodiments, the core layer is formed using a first polymer compound comprising the propylene ICP as described. The first additional layer and a second additional layer are formed using a second polymer compound. The second polymer compound comprises at least one of a polypropylene homopolymer, a random copolymer of propylene comprising from 0.01 mol. % to 5 mol. % of ethylene, the propylene ICP and blends thereof. The thickness of the core layer can be in the range of from 60% to 99% of the total thickness of the polymer sheet. The thickness of the first and the second additional layers can be in the range of from 2.5% to 40% of the total thickness of the polymer sheet.

In another respect, the present disclosure provides a fabricated article and a method for making the fabricated article, which comprises a core layer, a first additional layer and/or a second additional layer as described. The fabricated article comprises a wall, which can have a structure the same as that of the polymer sheet as described. The core layer comprises a propylene impact copolymer (ICP), which comprises: (a) a matrix comprising a polypropylene homopolymer or a propylene/alpha-olefin random copolymer which comprises greater than 50 wt. % of units derived from propylene monomer, and (b) a dispersed phase comprising a copolymer of ethylene and a $C_3$-$C_8$ α-olefin (e.g., an ethylene-propylene copolymer). The fabricated articles described herein can have clarity values of 80% or greater and haze values of 20% or less.

Examples of a suitable alpha-olefin as comonomer include but are not limited to butene, pentene, hexene, or octene. In some embodiments, the matrix is a propylene/alpha olefin random copolymer optionally comprising from 0.01 wt. % to 5 wt. %, for example, less than about 2.0 wt. %, of ethylene. In some embodiments, the dispersed phase can be in the range from 5 wt. % to 20 wt. % of the total weight of the ICP. The ICP has a first melting point being greater than 100° C. (e.g., in the range of from 100° C. to 130° C.) and a second melting point. In some embodiments, both the first melting point and the second melting point are greater than 100° C.

In some embodiments, the first or second polymer composition in the first or second additional layer comprises at least one of a polypropylene homopolymer, a random copolymer of propylene comprising from 0.01 mol. % to 5 mol. % of ethylene, the propylene ICP and blends thereof.

The polymer sheet and the fabricated article having selected compositions exhibit a combination of optical properties, such as high transparency and low haze, together with excellent impact resistance and stiffness. The polymer sheet, which is clear and tough, is suitable for applications such as walls for containers including but are not limited to food containers, drinking cups, water bottles, medical devices and toys. In some embodiments, the fabricated article is a container, for example, a cup having low haze and high clarity.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION OF THE INVENTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

Random copolymers, i.e., single phase polypropylene with a comonomer, have been used for applications that require clarity. These random copolymers, however, do not have desirable physical properties for applications where impact copolymers are normally used, particularly impact resistance at cold temperatures (e.g., about 4° C.).

In order to overcome the limitation of low impact toughness, metallocene copolymers (elastomers and plastomers) and styrenic block copolymers are sometimes blended into polypropylene. These additives work by either (a) having refractive indices that match that of polypropylene (approximately 1.50 micron) or (b) particle sizes that are small enough not to refract light and therefore cause haze. A blend of metallocene copolymers and polypropylene may give a first melting peak less than 100° C. (e.g, 99° C.) measured by differential scanning calorimetry (DSC) at a heating rate of 10° C./minute.

Incorporation of such additive components into polypropylene is not desirable, for a number of reasons. For example, it requires an additional compounding step which adds cost and complexity in both production and logistics. Additionally, the metallocene elastomers and styrenic block copolymers are often costly to produce relative to conventional Ziegler-Natta polypropylene (ZN-PP). Moreover, multiphase propylene copolymers having good impact toughness and decreasing stiffness can be prepared by means of Ziegler-Natta catalyst systems in a multistage polymerization reaction. However, the compositions that incorporate ethylene-propylene copolymers having a high proportion of ethylene into a polymer matrix make the multiphase propylene copolymer turbid. Poor miscibility of the dispersed phase with the polymer matrix leads to a separation of the phases and thus to turbidity and to poor transparency values of the heterogeneous copolymer. Ethylene-propylene copolymers prepared by means of conventional Ziegler-Natta catalysts also have a very inhomogeneous composition.

When ICPs are formed by blending a rubber with the matrix phase, it is desirable, from a cost-to-produce standpoint, that they are prepared using an in-reactor process, where the matrix and the dispersed phase are formed in separate reactors, typically operated in series. Thus, it would be desirable to have an in-reactor ICP which is clear, stiff, tough and which is not based on refractive index matching or using rubber with increased miscibility with the matrix.

The inventors have found a new method of making propylene ICP using Ziegler-Natta catalysts in an in-reactor solution, and the resulting propylene ICP having high clarity, low haze and high toughness. Costly blending and the use of metallocene elastomers are not used. The polypropylene ICP composition resulting from Ziegler-Natta catalysts ("ZN-PP") also includes additional components that may improve properties relative to metallocene catalyzed elastomers.

The inventors have also determined the resulting polypropylene ICP can be used as a core layer to form a polymer sheet (or film) or a fabricated article having a multi-layered structure. The resulting polymer sheet and the fabricated article have excellent clarity and toughness but low haze.

The term "polymer," as used herein, refers to a polymeric compound prepared by polymerizing monomers, whether of the same or a different type. The generic term polymer thus embraces the term "homopolymer," usually employed to refer to polymers prepared from only one type of monomer, as well as "copolymer" which refers to polymers prepared from two or more different monomers.

"Polypropylene" shall mean polymers comprising greater than 50% by weight of units which have been derived from propylene monomer. This includes polypropylene homopolymers or copolymers (meaning units derived from two or more comonomers).

For brevity, unless expressly indicated otherwise, references to "polypropylene ICP" made in the present disclosure will be understood to encompass any polypropylene having good impact resistance. In some embodiments, propylene impact copolymer (ICP) has a two-phase structure, comprising: (a) a matrix comprising a polypropylene homopolymer or a propylene/alpha-olefin random copolymer which comprises greater than 50 wt. % of units derived from propylene monomer, and (b) a dispersed phase comprising a copolymer of ethylene and a $C_3$-$C_8$ α-olefin (e.g., an ethylene-propylene copolymer).

Density is determined in accordance with ASTM D792.

As used herein, the "melt flow rate" (MFR) or "melt index" (units of g/10 min or dg/min) is described according to and measured per ASTM D1238 using a load of 2.16 kg at 230° C.

As used herein, haze generally refers to an appearance cause by scattered light upon passing through a film or sheet of a material can produce a smoky or translucent field. The haze of the present invention is measured using ASTM D1003-97.

As used herein, clarity generally refers to the amount of luminous transmittance described according to and measured per ASTM D1003.

As used herein, flexural modulus (expressed in units of PSI) is the one percent secant modulus, which is further described according to and measured per ASTM D790 at 230° C.

As used herein, notched Izod impact strength (expressed in ft-lbs/in) was measured at 23° C. as described according to and measured per ASTM D256.

As used herein, Gardner Impact was measured at 0, 4, and 23° C. according to ASTM D5420-10 in the GC configuration. It is expressed in in-lbs.

As used herein, molar phase gas ratio (or molar gas ratio) refers to the quantity of ethylene in a dispersed phase polymerization step and, thus, the dispersed phase. It is defined by the equation:

Molar Gas Ratio=mol % Ethylene/(mol % Ethylene+mol % Propylene)

In additional to ethylene and propylene, other gasses such as hydrogen, propane and inert gasses (e.g., nitrogen) may be used in a reactor. Nitrogen and propane, if used, are not reactive, and are used to help with fluidization and with increasing the heat capacity of the gas phase. Hydrogen, if used, acts as a polymer chain termination agent, and thereby controls the molecular weight of the dispersed phase. "Molar gas ratio" refers to the content of ethylene in the monomers.

As used herein, differential scanning calorimetry (or "DSC") describes a thermoanalytical technique in which the difference in the amount of heat required to increase the temperature of a sample and reference is measured as a function of temperature. About 5 to 10 mg of a sheet of the polymer pressed at approximately 200° C. is removed with a punch die and placed in a light aluminum pan (about 50 mg) and crimped shut. The thermal behavior was investigated using the following profile: The samples were heated to 200° C. and held isothermal for 3 minutes in order to remove any previous thermal history. The cooling and second heating curves were recorded in the temperature range of −20° C. to 200° C. using a scan rate of 10° C./min. Melting points of crystalline phases in a polymer composition can be determined using DSC.

As used herein, a "blender" test describes a measurement for performance, especially impact resistance, of thin walled thermoformed article such as a cup during a simulated blending operation. In the "blender" test, a blender (AstroBlender Mix-N-Blender Model AM-2, serial 30,370, manufactured by CRC, Inc.) was used. A sample cup (20 oz) was held on the blender with the blender shaft therein, which was thoroughly cleaned and dried. At room temperature, the cup was filled with a super-premium or premium ice cream to the level of about one inch below the rim. The ice cream was single flavored without chunks (density about 0.95 g/mL), and was exposed to room temperature for less than eight minutes before filled into the cup. About 4-5 tablespoons of candy chunks were then filled into the cup. The candy chucks were of firm ball and/or hard crack type, and had a dimension in the range from 0.050 inch to 0.550 inch (with an average of about 0.277 inch). The candy chucks had such a hardness that at least 40 N was required to compress as determined by a Tensipresser force-time curve. The candy chucks were stored at room temperature before use.

A cup collar made of stainless steel was fit onto the top of the cup. The top of the cup had a diameter equal to the diameter of the middle of the collar. The ice cream and the candy chucks were blended with the blender shaft half-way into the cup. The rotating blade was turned on to reach a maximum speed by gradually stepping onto a pedal of the blender. The cup was moved up and down. A failure was reported if a crack occurred through all layer of the sidewall of the cup within 15 seconds of blending. At least six specimens were repeated for each cup, and the times for "pass" or "failure" were recorded.

1. Propylene Impact Copolymer (ICP)

A novel class of propylene impact copolymer (ICP) is made using Ziegler-Natta catalyst in an in-reactor solution. The propylene ICP has a two-phase structure comprising: (a) a matrix comprising a polypropylene homopolymer or a propylene/alpha-olefin random copolymer which comprises greater than 50 wt. % of units derived from propylene monomer, and (b) a dispersed phase comprising a copolymer of ethylene and a $C_3$-$C_8$ α-olefin (e.g., an ethylene-propylene copolymer). In the matrix, examples of a suitable alpha-olefin as comonomer include but are not limited to butene, pentene, hexene, or octene. In some embodiments, the matrix is a propylene/alpha olefin random copolymer optionally comprising from 0.01 wt. % to 5 wt. %, for example, less than about 2.0 wt. %, of ethylene. In some embodiments, the dispersed phase can be in the range from 5 wt. % to 20 wt. % of the total weight of the ICP. The ICP has a first melting point being greater than 100° C. and a second melting point. In some embodiments, both the first melting point and the second melting point are greater than 100° C. For example, An ICP can have a first melting point in the range of from 100° C. to 130° C. (e.g., 120° C.). The first melting point may be attributed to that of the dispersed phase in some embodiments. The second melting point may be in the range from 100° C. to 180° C. (e.g., 150° C., 165° C. or any other suitable temperature). The second melting point may be attributed to that of the matrix phase in some embodiments.

The propylene ICP has high clarity, low haze and high toughness (or impact resistance). In some embodiments, the propylene impact copolymer (ICP) provided in the present disclosure has a haze value less than 30% in a 50 mil plaque, or less than 15% in a 20 mil plaque. In some embodiments, the propylene impact copolymer can have a Gardner impact value greater than 200 in-lbs.

The propylene impact copolymer can be made using one or more matrix phase polymerization steps, occurring in one or more gas phase reactors; one or more dispersed phase polymerization steps, occurring in one or more liquid phase reactors; and at least one de-gassing step. In some embodiments, the propylene ICP is made in an in-reactor comprising monomer including propylene and a comonomer such as ethylene. In the one or more matrix phase polymerization steps, alpha-olefin may be used as a comonomer. Examples of a suitable alpha-olefin include but are not limited to butene, pentene, hexene and heptene. The polymerization is catalyzed with Ziegler-Natta catalyst. In some embodiments, the dispersed phase of the propylene ICP can have a molar gas ratio greater than 0.82 in-reactor. In another words, molar ratio of ethylene monomer in the dispersed phase is higher than 0.82.

Catalysts employed in the polymerization of α-olefins may be characterized as supported catalysts or unsupported catalysts, sometimes referred to as homogeneous catalysts. The so-called conventional Ziegler-Natta catalysts are stereospecific complexes formed from a transition metal halide and a metal alkyl or hydride, such as titanium tetrachloride supported on an active magnesium dichloride. A supported catalyst component includes, but is not necessarily limited to, titanium tetrachloride supported on an "active" anhydrous magnesium dihalide, such as magnesium dichloride or magnesium dibromide. A supported catalyst component may be employed in conjunction with a co-catalyst such as an alkylaluminum compound, for example, triethylaluminum (TEAL). The Ziegler-Natta catalysts may also incorporate an electron donor compound that may take the form of various amines, phosphenes, esters, aldehydes, and alcohols.

Single site catalyzed polyolefins can differ from Ziegler-Natta catalyzed polyolefins in terms of molecular structure, particularly molecular weight and co-monomer distribution. The single site catalysts, such as metallocene catalysts, can create polyolefins with a narrow molecular weight distribution.

Metallocene catalysts are coordination compounds or cyclopentadienyl groups coordinated with transitional metals through π-bonding. Metallocene catalysts are often employed as unsupported or homogeneous catalysts, although they also may be employed in supported catalyst components. With respect to the metallocene random copolymers, this term denotes polymers obtained by copolymerizing ethylene and an α-olefin, such as propylene, butene, hexene or octene, in the presence of a monosite catalyst generally consisting of an atom of a metal which may, for example, be zirconium or titanium, and of two cyclic alkyl molecules bonded to the metal. More specifically, the metallocene catalysts generally consist of two cyclopentadiene-type rings bonded to the metal.

The impact modifying components in this composition were made using a heterogeneous Ziegler-Natta catalyst. Therefore, it is expected that several compositions exist in the impact modifying component. It was unexpected that ZN-catalyzed polypropylene would produce a dispersed phase component that avoids significant haze in the final composition. In some embodiments, high ethylene content is used to achieve a product having both high impact resistance and low haze.

Some of the compositions of the present invention are prepared in a sequential polymerization process wherein a propylene based polymer (defined as the ICP "matrix") is prepared first, followed by the preparation of a copolymer rubber. The composition described herein can be prepared using a Ziegler-Natta catalyst, a co-catalyst such as triethylaluminum ("TEA"), and optionally an electron donor including the non-limiting examples of dicyclopentyldimethoxysilane ("DPCMS"), cyclohexylmethyldimethoxysilane ("CMDMS"), diisopropyldimethoxysilane ("DIPDMS"), di-t-butyldimethoxysilane, cyclohexylisopropyldimethoxysilane, n-butylmethyldimethoxysilane, tetraethoxysilane, 3,3,3-trifluoropropylmethyldimethoxysilane, mono and di-alkylaminotrialkoxysilanes or other electron donors known in the art or combinations thereof. Examples of different generation Ziegler-Natta catalysts that can be applied to the practice of the present invention are described in the "Polypropylene Handbook" by Nello Pasquini, 2nd Edition, 2005, Chapter 2 and include, but are not limited to, phthalate-based, di-ether based, succinate-based catalysts or combinations thereof. The catalyst system is introduced at the beginning of the polymerization of propylene and is transferred with the resulting propylene based polymer to the copolymerization reactor where it serves to catalyze the gas phase copolymerization of propylene and ethylene (or a higher alpha-olefin) to produce the rubber phase (also referred to here as bi-polymer). The compositions can also be prepared using metallocene, post-metallocene, or single-site catalysts such as those described in the "Polypropylene Handbook" by Nello Pasquini, 2nd Edition, 2005.

Compositions can also be blends of elastomer with polypropylene homopolymer and random copolymer. These compositions can be made by blending or otherwise dispersing particles of elastomer into a matrix of the propylene-based polymer. The propylene-based polymer and the elastomer may be combined by way of dry blending and/or melt blending. Nonlimiting examples of suitable elastomers include: olefin-based elastomers (i.e., propylene-based elastomers and/or ethylene-based elastomers), polyamide elastomers, elastomeric polyesters, isobutylene polymers, polyurethane elastomers, acrylic elastomers, natural rubber, polybutadiene, polyisoprene, a styrene-based, hydrogenated block copolymer, and any combination of the foregoing. A styrene-based, hydrogenated block copolymer rubber has a structure containing a segment A having a polystyrene structure at 1 to 25% by weight, A-B or A-B-A wherein, A is a segment of polystyrene structure, and B is a segment of ethylene/butene or ethylene/propylene structure. In an embodiment, the olefin-based elastomer is an ethylene-based elastomer. The term, "ethylene-based elastomer," as used herein, is a polymer that comprises a majority weight percent polymerized ethylene monomer (based on the total weight of polymerizable monomers), and optionally may comprise at least one (or more) polymerized comonomer, the ethylene-based polymer having the properties of an elastomer as defined above. Nonlimiting examples of suitable ethylene-based elastomers include ethylene/α-olefin copolymers such as ethylene and C3-C8 α olefin comonomer (ethylene/propylene copolymer, ethylene/butene copolymer, ethylene/hexene copolymer, and/or ethylene/octene copolymer), and/or olefin block copolymer (OBC). In an embodiment, the olefin-based elastomer is an ethylene-based elastomer and has a melt index (or a melt flow rate) from about 0.5 g/10 min to about 30 g/10 min. The ethylene-based elastomer has a density from about 0.85 g/cc to about 0.91 g/cc, or from about 0.86 g/cc to about 0.888 g/cc. In a further embodiment, the ethylene-based elastomer has a density less than 0.885 g/cc or less than 0.880 g/cc.

2. Multi-Layered Polymer Sheet and Fabricated Article

Figure 1:
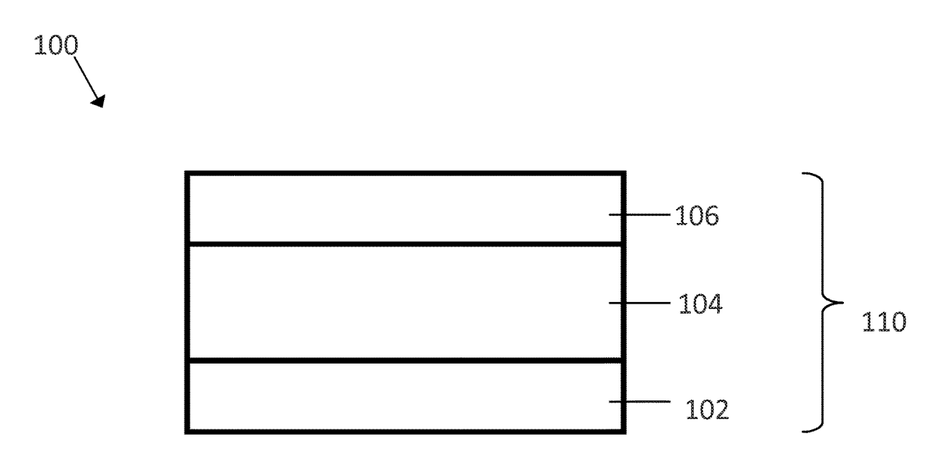
FIG. 1 is a cross-sectional view of an exemplary polymer sheet in accordance with some embodiments.

FIG. 1 illustrates an exemplary polymer sheet 100 having a multi-layered structure in accordance with some embodiments. Polymer sheet 100 is shown for the purpose of illustration only. FIG. 1 can also illustrate a wall of a fabricated article having multi-layered structure in some embodiments.

The exemplary polymer sheet 100 comprises a core layer 104 comprising a propylene impact copolymer (ICP) as described above, and a first additional layer 102 comprising a first polymer composition.

The propylene ICP in the core layer 104 includes a matrix and a dispersed phase. The matrix comprises a polypropylene homopolymer or a propylene/alpha-olefin random copolymer which comprises greater than 50 wt. % of units derived from propylene monomer. In the matrix, examples of a suitable alpha-olefin as comonomer, if used, include but are not limited to butene, pentene, hexene, or octene. In some embodiments, the matrix is a propylene/alpha olefin random copolymer optionally comprising from 0.01 wt. % to 5 wt. %, for example, less than about 2.0 wt. %, of ethylene. The dispersed phase comprises a copolymer of ethylene and a $C_3$-$C_8$ α-olefin (e.g., an ethylene-propylene copolymer). In embodiments, the dispersed phase can be in the range from 5 wt. % to 20 wt. % of the total weight of the ICP.

The propylene ICP in the core layer 104 has a first melting point being greater than 100° C. and a second melting point. In some embodiments, both the first melting point and the second melting point are greater than 100° C. For example, An ICP can have a first melting point in the range of from 100° C. to 130° C. (e.g., 120° C.). The first melting point may be attributed to that of the dispersed phase in some embodiments. The second melting point may be in the range from 100° C. to 180° C. (e.g., 150° C., 165° C. or any other suitable temperature). The second melting point may be attributed to that of the matrix phase in some embodiments.

In some embodiments, the first polymer composition in the first additional layer 102 comprises at least one of a polypropylene homopolymer, a random copolymer of propylene comprising 0.01-5 molar percent (mol. %) of ethylene, the propylene ICP and blends thereof.

In some embodiments, the polymer sheet 100 further comprises a second additional layer 106 comprising a second polymer composition. The first additional layer 102 and the second additional layer 106 can be in direct contact with the core layer 104 to form a sandwiched structure 110 in some embodiments. The second polymer composition in the second additional layer 106 comprises at least one of a polypropylene homopolymer, a random copolymer of propylene comprising 0.01-5 mol. % of ethylene, the propylene ICP and blends thereof. In some embodiments, the first additional layer 102 and the second additional layer 106 comprise the same composition.

In some embodiments, the first additional layer 102 or the second additional layer 106 comprises a blend comprising 15-50 wt. % of the propylene ICP and 50-85 wt. % of polypropylene homopolymer or a random copolymer of propylene comprising from 0.01% to 5 mol. % of ethylene. In some embodiments, the first additional layer 102 or the second additional layer 106 comprises a blend comprising about 20% of the propylene ICP and about 80% of polypropylene homopolymer or a random copolymer of propylene comprising ethylene in the range from 0.2 mol. % to 1 mol. %, for example, 0.5 mol. %.

The thickness of the core layer 104 can be in the range of from 60% to 99%, for example, in the range of from 70% to 80%, of the total thickness of the polymer sheet 100. The thickness of the first additional layer 102 and the second additional layer 104 is in the range of from 2.5% to 40%, for example, in the range of from 20% to 30%, of the total thickness of the polymer sheet 100. The first additional layer 102 and the second additional layer 104 can have the same thickness. For example, examples of a suitable combination of layer 102/core layer 104/layer 106 (with thickness in mil) include but are not limited to 10/30/10, 7.5/35/7.5, and 5/40/5.

The structure of the polymer sheet 100 is not limited to a two-layer or three-layer sandwiched structure 110. The polymer sheet 100 can have more than three layers comprising any number of the core layer 104, the first additional layer 102 and the second additional layer 106 in any combination.

The present disclosure also provides a fabricated article having a wall with a multi-layered structure as shown in FIG. 1. For example, the wall of the fabricated article comprises a core layer 104 and a first additional layer 102 comprising a first polymer composition. The core layer 104 comprises a propylene impact copolymer (ICP) having a two-phase structure as described.

In some embodiments, the first polymer composition in the first additional layer 102 comprises at least one of a polypropylene homopolymer, a random copolymer of propylene comprising from 0.01 mol. % to 5 mol. % of ethylene, the propylene ICP and blends thereof.

In some embodiments, the fabricated article further comprises a second additional layer 106 comprising a second polymer composition. The first additional layer 102 and the second additional layer 106 are in direct contact with the core layer 104 to form a sandwiched structure 110 as shown in FIG. 1. In some embodiments, the first additional layer 102 and the second additional layer 106 comprise the same composition.

The thickness of the core layer can be in the range of from 60% to 99%, for example, in the range of from 70% to 80%, of the total thickness of the wall. The thickness of the first additional layer 102 and the second additional layer 106 is in the range of from 2.5% to 40%, for example, in the range of from 20% to 30%, of the total thickness of the wall.

In some embodiments, the first additional layer or the second additional layer comprises a blend comprising 15-50 wt. % of the propylene ICP and 50-85 wt. % of polypropylene homopolymer or a random copolymer of propylene comprising from 0.01 mol. % to 5 mol. % of ethylene, for example, in the range from 0.2 mol. % to 1 mol. % (e.g., 0.5 mol. %).

In some embodiments, the fabricated article is a container, for example, a cup having low haze and high clarity.

A method of making the polymer sheet (or film or laminate) 100 is also provided. The method comprises a step of co-extruding the core layer 104 and the first additional layer 104. In some embodiments, the core layer 104, the first additional layer 102 and a second additional layer 106 are co-extruded in an extruder through a single coextrusion step. The extruder is configured so that the first additional layer 102 and the second additional layer 106 are in direct contact with the core layer 104. In some embodiments, the core layer 104 is formed using a first polymer compound comprising the propylene ICP as described. The first additional layer 102 and a second additional layer 106 are formed using a second polymer compound. The second polymer compound comprises at least one of a polypropylene homopolymer, a random copolymer of propylene comprising from 0.01 mol. % to 5 mol. % of ethylene, the propylene ICP and blends thereof. The thickness of the core layer 104 is in the range of from 60% to 99% (e.g., 70-80%) of the total thickness of the polymer sheet 100. The thickness of the first and the second additional layers (102 and 106) is in the range of from 2.5% to 40% (e.g., 20-30%) of the total thickness of the polymer sheet 100.

The polymer sheet can be formed by multi-layer co-extrusion. Melted compounds are extruded through a multi-layer multi-ply die in such a positional relation that the core layer 104 is located between the first additional layer 102 and the second additional layer 106. The extrudate is formed into a film, a sheet, a pipe for a container or a preform for a container. In case of a preform for a container, for example, a bottle, the extruded melt resin layer laminate pipe can be subjected to preliminary blow forming into a preform having the mouth and the bottom in a mold, or the extruded melt multi-layer pipe is quenched and then cut into a predetermined length, and then both the ends of the resulting pipe having openings on both the ends are heated and formation of the mouth and fusion bonding of the bottom are accomplished by compression forming. Thus, a preform for a bottle is obtained.

The multi-layer polymer sheet or film can be preliminarily heated and then formed into a cup by vacuum forming, air pressure forming, plug assist forming or press forming. The cup-type polypropylene containers can be also formed by injection molding or by compressed air molding.

Formation of the laminate can also be accomplished by other techniques such as hot pressing, sandwich lamination, extrusion coating or thin wall injection molding.

3. Examples

The following polymers were used in making examples shown in Table 1.

Polymer A is a propylene ICP made using Ziegler-Natta catalyst in an in-reactor solution. Polymer A has a two-phase structure, and is an ethylene random impact copolymer (ERIC). The matrix phase is a random copolymer with 98 wt. % of propylene and 2 wt. % of ethylene. The dispersed phase is 20 wt. % of the total weight of Polymer A. The dispersed phase is made in a fluidized bed reactor that has a molar gas phase ratio of 0.90. Polymer A has two melting points of 120° C. and 148° C. (measured using DSC at a rate of 10° C./min), which are attributed to the melting point of the dispersed phase and the matrix phase, respectively. Polymer A provides a flexural modulus of 150,000 kpsi (ASTM D 790A, molded and tested in accordance with ASTM D 4101), a melt flow rate of 2.0 dg/min (ASTM D 1238 (230° C./2.16 kg)), a notched Izod impact resistance of 5 ft-lb/in (ASTM D 256, molded and tested in accordance with ASTM D 4101). Polymer A is nucleated with Milliken® NX®8000, available from Milliken Chemical Company.

Polymer B is a random copolymer of propylene comprising 0.5 wt. % of ethylene. Polymer B has a melting point of 160° C. (measured using DSC), a flexural modulus of 230,000 kpsi (ASTM D 790A, molded and tested in accordance with ASTM D 4101), a melt flow rate of 2.0 dg/min (ASTM D 1238 (230° C./2.16 kg)), a notched Izod impact resistance of 1 ft-lb/in (ASTM D 256, molded and tested in accordance with ASTM D 4101). Polymer B is nucleated with AMFINE NA-11, available from AMFINE Chemical Corporation.

Polymer C is a random copolymer of propylene comprising 3.2 wt. % of ethylene. Polymer C has a melting point of 140° C. (measured using DSC), a flexural modulus of 170 kpsi (ASTM D 790A, molded and tested in accordance with ASTM D 4101), a melt flow rate of 2.0 dg/min (ASTM D 1238 (230° C./2.16 kg)), a notched Izod impact resistance of 1 ft-lb/in (ASTM D 256, molded and tested in accordance with ASTM D 4101).

In Table 1, the core layer 104 comprises a propylene ICP, Polymer A (i.e. the first compound). The first additional layer 102 and the second additional layer 106 comprise the same compound (i.e. the second compound). The thickness of each layer is shown in Table 1. In Examples 4-9, the second compound for the first additional layer 102 and the second additional layer 106 is a blend comprising two or more polymers, one of which can be propylene ICP, Polymer A. The second compound for the first additional layer 102 and the second additional layer 106, and the first compound for the core layer 104 were co-extruded to form a sandwiched structure 110 comprising the three layers 102, 104 and 106. During the coextrusion, if the second compound for layer 102 or 106 comprises at least two polymers selected from Polymer A, Polymer B and Polymer C, the at least two polymers in pellet forms were fed into a corresponding hopper that connected with the extruder. The at least two polymers were mixed in the extruder.

TABLE 1

| Ext. # | Layer 102 | Layer 104 | Layer 106 |
|---|---|---|---|
| 1 | Polymer B (0.003") | Polymer A (0.114") | Polymer B (0.003") |
| 2 | Polymer B (0.006") | Polymer A (0.108") | Polymer B (0.006") |
| 3 | Polymer C (0.00425") | Polymer A (0.0765") | Polymer C (0.00425") |

TABLE 1-continued

| Ext. # | Layer 102 | Layer 104 | Layer 106 |
|---|---|---|---|
| 4 | 20% Polymer A/80% Polymer C (0.00425") | Polymer A (0.0765") | 20% Polymer A/80% Polymer C (0.00425") |
| 5 | 50% Polymer A/50% Polymer C (0.00425") | Polymer A (0.0765") | 50% Polymer A/50% Polymer C (0.00425") |
| 6 | 20% Polymer A/80% Polymer B (0.00425") | Polymer A (0.0765") | 20% Polymer A/80% Polymer B (0.00425") |
| 7 | 25% Polymer A/75% Polymer B (0.00425") | Polymer A (0.0765") | 25% Polymer A/75% Polymer B (0.00425") |
| 8 | 30% Polymer A/70% Polymer B (0.00425") | Polymer A (0.0765") | 30% Polymer A/70% Polymer B (0.00425") |
| 9 | 20% Polymer A/40% Polymer B/40% Polymer C (0.00425") | Polymer A (0.0765") | 20% Polymer A/40% Polymer B/40% Polymer C (0.00425") |

The "blender" test result, and optical properties including haze and clarity of Example 1-9 are listed in Table 2.

TABLE 2

| | "Blender" Test | | | |
|---|---|---|---|---|
| Ext. # | Pass | Fail | Haze (%) | Clarity (%) |
| 1 | 5 | 0 | 5.3 | 91.5 |
| 2 | 2 | 3 | 5 | 93.3 |
| 3 | 5 | 0 | 7.2 | 85.1 |
| 4 | 5 | 0 | 8.9 | 91 |
| 5 | 5 | 0 | 15.9 | 88.1 |
| 6 | 5 | 0 | 9.1 | 93.1 |
| 7 | 5 | 0 | 12.8 | 93.4 |
| 8 | 5 | 0 | 13.4 | 92.6 |
| 9 | 5 | 0 | 14.5 | 93.6 |

As shown in Table 2, the polymer sheets in the present disclosure display high impact resistance, excellent clarity and low haze. A polymer sheet (or a fabricated article) having a multi-layered structure comprising the propylene ICP as described can be used for food containers, drinking cups, water bottles, medical devices and toys. The propylene ICP can replace other materials such as polyolefin and polycarbonate. For example, the polymer sheet having a multi-layered structure comprising the propylene ICP can be useful as a transparent cup having excellent clarity and impact toughness.

Although the subject matter has been described in terms of exemplary embodiments, it is not limited thereto. Rather, the appended claims should be construed broadly, to include other variants and embodiments, which may be made by those skilled in the art.

What is claimed is:

1. A polymer sheet, comprising:
a core layer comprising a propylene impact copolymer (ICP), the propylene ICP comprising:
(a) a matrix comprising a polypropylene homopolymer or a propylene/alpha-olefin random copolymer which comprises greater than 50 wt. % of units derived from propylene monomer, and
(b) a dispersed copolymer which comprises ethylene and a $C_3$-$C_8$ α-olefin,
wherein the ICP has a first melting point between 100° C. and 130° C. and a second melting point between 106° C. and 180° C.; and
a first additional layer comprising a first polymer composition,
wherein the molar ratio of ethylene monomer in the dispersed phase is greater than 0.82,
the polymer sheet further comprising a second additional layer comprising a second polymer composition, wherein the first additional layer and the second additional layer are in direct contact with the core layer, and the first additional layer or the second additional layer include a propylene ICP which comprises a blend comprising 15-50 wt. % of the propylene ICP and 50-85 wt. % of propylene homopolymer or a random copolymer of propylene comprising from 0.01 mol. % to 5 mol. % of ethylene.

2. The polymer sheet of claim 1, wherein
the first polymer composition in the first additional layer comprises at least one of a polypropylene homopolymer, a random copolymer of propylene comprising from 0.01 molar percent (mol. %) to 5 mol. % of ethylene, the propylene ICP and blends thereof.

3. The polymer sheet of claim 1, wherein
the second polymer composition in the second additional layer comprises at least one of a polypropylene homopolymer, a random copolymer of propylene comprising from 0.01 mol. % to 5 mol. % of ethylene, the propylene ICP and blends thereof.

4. The polymer sheet of claim 1, wherein
the first additional layer and the second additional layer comprise the same composition.

5. The polymer sheet of claim 3, wherein
the thickness of the core layer is in the range of from 60% to 99% of the total thickness of the polymer sheet; and
the thickness of the first and the second additional layers is in the range of from 2.5% to 40% of the total thickness of the polymer sheet.

6. The polymer sheet of claim 1, wherein
the first additional layer or the second additional layer include a propylene ICP which comprises a blend comprising about 20% of the propylene ICP and about 80% of polypropylene homopolymer or a random copolymer of propylene comprising ethylene in the range from 0.2 mol. % to 1 mol. %.

7. The polymer sheet of claim 1, wherein haze is less than 20%.

8. The polymer sheet of claim 1, wherein clarity is greater than 80%.

9. A fabricated article, comprising:
a core layer comprising a propylene impact copolymer (ICP), the propylene ICP comprising:
(a) a matrix comprising a polypropylene homopolymer or a propylene/alpha-olefin random copolymer which comprises greater than 50 wt. % of units derived from propylene monomer, and
(b) a dispersed copolymer which comprises ethylene and a $C_3$-$C_8$ α-olefin,
wherein the ICP has a first melting point between 100° C. and 130° C. and a second melting point between 106° C. and 180° C.; and
a first additional layer comprising a first polymer composition,
wherein the molar ratio of ethylene monomer in the dispersed phase is greater than 0.82,
the fabricated article further comprising a second additional layer comprising a second polymer composition, wherein the first additional layer and the second additional layer are in direct contact with the core layer, and the first additional layer or the second additional layer include a propylene ICP which comprises a blend comprising 15-50 wt. % of the propylene ICP and 50-85 wt. % of propylene homopolymer or a random copolymer of propylene comprising from 0.01 mol. % to 5 mol. % of ethylene.

10. The fabricated article of claim 9, wherein
the first polymer composition in the first additional layer comprises at least one of a polypropylene homopolymer, a random copolymer of propylene comprising from 0.01 mol. % to 5 mol. % of ethylene, the propylene ICP and blends thereof.

11. The fabricated article of claim 9, wherein
the first additional layer and the second additional layer comprise the same composition.

12. The fabricated article of claim 9, wherein
the thickness of the core layer is in the range of from 60% to 99% of the total thickness of the polymer sheet; and
the thickness of the first and the second additional layers is in the range of from 2.5% to 40% of the total thickness of the polymer sheet.

13. The fabricated article of claim 9, wherein the fabricated article is a container.

14. The fabricated article of claim 9, wherein the fabricated article is a cup.

15. A method of making the polymer sheet of claim 1, comprising a step of co-extruding the core layer and the first additional layer.

16. The method of claim 15, wherein
the core layer, the first additional layer and a second additional layer are co-extruded together in a single coextrusion step; and
the first and the second additional layers are in direct contact with the core layer.

17. The method of claim 15, wherein
the thickness of the core layer is in the range of from 60% to 99% of the total thickness of the polymer sheet; and
the thickness of the first and the second additional layers is in the range of from 1.0% to 40% of the total thickness of the polymer sheet.

18. The fabricated article of claim 9, wherein haze is less than 20%.

19. The fabricated article of claim 9, wherein clarity is greater than 80%.

* * * * *